Patented Jan. 18, 1949

2,459,138

UNITED STATES PATENT OFFICE 2,459,138

NICOTINE AND BETA-BETA-DICHLOR-ETHYL ETHER INSECTICIDE

Owen T. Coffin and David J. Raden, Los Angeles, Calif., assignors to Swift & Company, Chicago, Ill., a corporation of Illinois No Drawing. Application November 22, 1944, Serial No. 564,724

9 Claims. (Cl. 167—22)

This invention relates to insecticides and more particularly to insecticides containing nicotine either in the form of the alkaloid or as nicotine sulfate in conjunction with another material which markedly increases the efficiency of the nicotine as an insecticide.

In accordance with the present invention it has been found that insecticides containing both nicotine and beta-beta-dichlorethyl ether are much more effective than insecticides containing either of these materials and not the other. The effectiveness of the insecticide containing both materials is remarkably greater than would be expected from insecticides containing only one of these materials. Thus, it has been found that the efficiency of nicotine either in the form of the alkaloid or sulfate is greatly increased in efficiency as a general killing agent, particularly at low temperatures by the presence of the dichlorethyl ether.

Nicotine has heretofore been employed in an alkaline carrier in order to activate the nicotine whereas in accordance with the present invention the nicotine is active when employed in either an acid or alkali carrier. Thus, the present invention for the first time enables other insecticides or fungicides, effective only in acid carrier, to be employed with nicotine. It has also been found that the combination of nicotine and beta-beta-dichlorethyl ether causes the insecticide to remain effective for a much longer period of time than is the case when these materials are employed individually in insecticides to thereby improve the characteristics of the insecticide as an insect feeding inhibitor.

The combined nicotine and beta-beta-dichlorethyl ether may be employed as a liquid spray or as a dusting material, for example with the active ingredients carried by an inert powdered material, or in sprays with the active ingredients in solution or carried by finely divided solid material suspended in a liquid medium. Other active insecticides, fungicides, etc., as well as emulsifying agents, wetting agents, adhesives, etc., may be employed in conjunction with the nicotine and the dichlorethyl ether as long as they are compatible with the nicotine or the dichlorethyl ether. In general, it has been found that most materials suitable for insecticide dusting materials or sprays can be employed without deleterious effect upon the nicotine or the dichlorethyl ether. This is particularly true since the combined nicotine and dichlorethyl ether can be employed in either an alkaline or acid medium.

It is, therefore, an object of the present invention to provide an improved insecticide containing nicotine.

Another object of the invention is to provide an improved insecticide in which the efficiency of the nicotine as a killing agent is increased at low temperatures.

Another object of the invention is to provide an improved insecticide in which nicotine may be employed as a killing agent in an acid as well as an alkaline carrier.

A further object of the invention is to provide an insecticide containing nicotine which has increased efficiency as an insect feeding inhibitor.

A further object of the invention is to provide an insecticide containing nicotine in which the amount of nicotine employed is materially reduced while still retaining the same efficiency as an insecticide.

A still further object of the invention is to provide an improved insecticide in which the insecticidal properties of nicotine are markedly increased by the presence of beta-beta-dichlorethyl ether.

As indicated above insecticides containing nicotine and beta-beta-dichlorethyl ether in accordance with the present invention can be prepared in various forms. An effective manner of carrying out the invention is to distribute the nicotine and the dichlorethyl ether upon an inert finely divided carrier, such as diatomaceous earth clay or other material. A relatively large amount of effective dusting insecticide containing small amounts of nicotine and the dichlorethyl ether can thus be produced. The invention will be specifically described with respect to such a dusting insecticide although it is to be understood that liquid sprays containing small amounts of the active ingredients either in solution or supported upon a finely divided solid material are as effective, if not more effective, than the dusting insecticides.

For the purposes of showing the increased efficiency of insecticides containing both nicotine and dichlorethyl ether as compared to similar insecticides containing beta-beta-dichlorethyl ether alone or nicotine alone, a series of finely divided powdered insecticides consisting of the active ingredients supported upon diatomaceous earth as a carrier were prepared and tested upon a wide variety of insects. These dusts were prepared by adding a small quantity of 80% nicotine alkaloid or beta-beta-dichlorethyl ether to acid diatomaceous earth, or by adding a mixture of 80% nicotine alkaloid and dichlorethyl ether to acid diatomaceous earth depending upon the product desired, and then agitating until the liquid material was uniformly distributed on the particles of the diatomaceous earth. The final pH of the various dusts as determined by a five to one aqueous extract varied between 5.5 and 6.5.

Dust A was prepared so as to contain 2% nicotine expressed as alkaloid. Dust B was prepared so as to contain 2% beta-beta-dichlorethyl ether. Dust C was prepared so as to contain 2% nicotine expressed as alkaloid and 2% beta-beta-dichlorethyl ether. Dust D was prepared so as to contain 4% nicotine expressed as alkaloid; and dust E was prepared so as to contain 4% nicotine expressed as alkaloid plus 2% dichlorethyl ether. The insect killing efficiency of these various dusts was then employed on a series of insect pests, using the same amount of dust in each case. In comparative tests the temperature and other conditions were maintained the same. The percentage of insects killed at various temperatures and at the end of various periods of time, was then determined and the results of such tests are shown in the following tables:

temperature and the length of the test. It will further be noted that the dichlorethyl ether alone was a relatively inefficient insecticide whereas the nicotine alone was much better than the dichlorethyl ether. Nevertheless, in each case the efficiency of dusts containing both nicotine and dichlorethyl ether was greater than the sum of the efficiencies of the dichlorethyl ether alone and the nicotine alone except in one case where all of the insects were killed by the insecticides containing both ingredients before the completion of the tests so that the test was inclusive. In nearly all tests the efficiency of the combined ingredients was very much greater than the individual efficiencies.

The examples in the above tables are believed to be sufficient to demonstrate the increased efficiency of nicotine insecticides when dichlorethyl ether is present. It is pointed out, however, that a large number of other tests have been made on other insects giving comparable results, and that various types of liquid insecticides suitable for spraying have given similar results. Also, insecticides containing other active insec-

TABLE I

*Examples showing increased nicotine efficiency in combination with beta-beta-dichlorethyl ether at various temperatures*

| Insect Tested | Average Temperature during Test | Time for Test in hours | Per Cent Dead from Materials Shown Below | | |
|---|---|---|---|---|---|
| | | | Dust A | Dust B | Dust C |
| | | | 2% Nicotine | 2% Dichlorethyl ether | 2% Nicotine Plus 2% Dichlorethyl ether |
| | °F. | Hours | | | |
| Cabbage Aphis (*Aphis brassicae*) | 65 | 12 | 52% dead | 12% dead | 87% dead. |
| | 65 | 24 | 60% dead | 13% dead | 95% dead. |
| | 75 | 12 | 65% dead | 15% dead | 97% dead. |
| Large Rose Aphis (*Macrosiphum rosae*) | 60 | 12 | 37% dead | 12% dead | 90% dead. |
| | 60 | 24 | 39% dead | 13% dead | 98% dead. |
| | 75 | 12 | 52% dead | 13% dead | 99% plus dead. |
| Green Citrus Aphis (*Spireacola aphis*) | 60 | 12 | 35% dead | 10% dead | 84% dead. |
| | 75 | 12 | 50% dead | 12% dead | 91% dead. |
| Cucumber Beetle (*Diabrotica Soror*) | 70 | 12 | 15% dead | 3% dead | 69% dead. |
| | | 24 | 20% dead | 6% dead | 74% dead. |
| Cucumber Beetle (*Diabrotica Vittata*) | 70 | 12 | 18% dead | 10% dead | 75% dead. |
| | | 24 | 25% dead | 11% dead | 100% dead. |
| Harlequin Bug (*Murgantia Histrionica*) | 75 | 12 | 10% dead | 3% dead | 55% dead. |
| | | 24 | 20% dead | 5% dead | 70% dead. |
| Steel Blue Elm Beetle (*Haltica Bimarginata*) | 70 | 12 | 33% dead | 5% dead | 100% dead (5 hours). |

TABLE II

*Examples showing increased nicotine efficiency in combination with dichlorethyl ether at various temperatures*

| Insect Tested | Average Temperature during test | Time for Test in Hours | Per Cent Dead from Materials Shown Below | | |
|---|---|---|---|---|---|
| | | | Dust D | Dust B | Dust E |
| | | | 4% Nicotine | 2% Dichlorethyl ether | 4% Nicotine plus 2% dichlorethyl ether |
| | °F. | Hours | | | |
| Cabbage Aphis (*Aphis Brassicae*) | 65 | 12 | 72% dead | 12% dead | 94% dead. |
| | 65 | 24 | 83% dead | 13% dead | 98% dead. |
| | 75 | 12 | 90% dead | 15% dead | 100% dead. |
| Large Rose Aphis (*Macrosiphum Rosae*) | 60 | 12 | 62% dead | 12% dead | 91% dead. |
| | 60 | 24 | 64% dead | 13% dead | 98% dead. |
| | 75 | 12 | 75% dead | 13% dead | 100% dead. |
| Green Citrus (*Aphis Spireacola*) | 65 | 12 | 62% dead | 11% dead | 93% dead. |
| | | 24 | 65% dead | 13% dead | 99% dead. |
| Cucumber Beetle (*Diabrotica Soror*) | 70 | 12 | 20% dead | 3% dead | 85% dead. |
| | | 24 | 25% dead | 6% dead | 98% dead. |
| Cucumber Beetle (*Diabrotica Vittata*) | 70 | 12 | 23% dead | 10% dead | 100% dead. |
| | | 24 | 28% dead | 11% dead | |
| Harlequin Bug (*Murgantia Histrionica*) | 75 | 12 | 40% dead | 3% dead | 82% dead. |
| | | 24 | 46% dead | 5% dead | 89% dead. |
| Steel Blue Elm Beetle (*Haltica Bimarginatus*) | 70 | 12 | 45% dead | 5% dead | 100% dead (5 hours). |

From the above tables it will be noted that the killing efficiency of all of the dusts increased with ticidal ingredients, fungicides, emulsifying agents, wetting agents, odor masking agents, etc., exhibit the same general increase in efficiency when the dichlorethyl ether is employed in conjunction with the nicotine. As stated above, the nicotine may be employed either as the alkaloid itself or as a nicotine derivative such as nicotine sulphate. Furthermore, the inert carrier in dusting insecticides need not be diatomaceous earth but may be any natural or synthetic finely divided adsorbent or absorbent material. For example, bentonite or other colloidal clay is an extremely effective carrier, particularly where the insecticide is intended to be employed either as a dusting material or as a spray when the powdered material is suspended in a liquid. The colloidal clay readily emulsifies in water and eliminates or decreases the necessary amount of other emulsifying agents required when a powdered material consisting essentially of a diatomaceous earth or other non-colloidal material is suspended in water. Even if one or more of the active ingredients are soluble in the liquid medium, evaporation of the liquid leaves the active materials on the finely divided solid upon application of the spray.

The fact that the nicotine may be employed upon an acid carrier or in an acid medium when used in conjunction with dichlorethyl ether is an advantage enabling the nicotine to be used in conjunction with the insecticidal ingredients requiring an acid carrier or acid medium to retain their efficiency, for example cryolite. This fact also eliminates the necessity of adding lime or other alkaline agents to activate the nicotine. The combined ingredients may, however, be employed in an alkaline medium or on an alkaline carrier, if desired. In general, insecticides containing beta-beta-dichlorethyl ether in addition to nicotine may be effectively employed at much lower temperatures than insecticides with nicotine without the dichlorethyl ether. Thus, the killing efficiency at temperatures as low as 60° F. with the combined ingredients is comparable with the efficiency at 80° F. or higher with the same amount of nicotine employed without the dichlorethyl ether. Due to the increased efficiency the percentage of nicotine essential to secure control of insects can be reduced over standard nicotine insecticides.

Furthermore, the properties of the insecticides as a feeding inhibitor is markedly increased when beta-beta-dichlorethyl ether is added to insecticides containing nicotine. For example, squash plants dusted with nicotine-dichlorethyl ether insecticide for the control of diabrotica beetles were not reinfested for twenty-one days, whereas with a similar insecticide containing nicotine alone or beta-beta-dichlorethyl ether alone, the plants were re-infested within forty-eight hours. In a similar test for the control of cabbage aphis there was no reinfestation for at least two weeks, whereas reinfestation took place within four or five days with similar insecticides containing nicotine or dichlorethyl ether alone.

The amount of nicotine required in insecticides in accordance with the present invention will vary with the insect to be controlled and the temperature during the time the insecticide is available for contact with the insects. As stated, the amount of nicotine is in general much less than for similar insecticides not containing dichlorethyl ether. Thus, insecticides containing between ½ and 5% nicotine have been found to be effective for substantially all purposes and, in general, commercial insecticides need not contain more than 4% nicotine. The amount of dichlorethyl ether required for effectively increasing the efficiency of the nicotine is usually considerably less than the amount of nicotine present. Thus, the amount of dichlorethyl ether may vary between ¼ and 3%, although it may be employed in greater quantities without deleterious effect upon the insecticide. In general, the amount of dichlorethyl ether will range between 25 and 100% of the amount of nicotine present but may be greater if desired. It is apparent that an insecticide containing nicotine either as the alkaloid or sulphate and dichlorethyl ether may be prepared and sold in concentrated form for subsequent dilution.

In preparing commercial insecticides it has been found advantageous to employ a mixture of inert powdered carriers, at least one of which is a colloidal clay. For example, a portion of the nicotine can be distributed upon diatomaceous earth and a portion upon bentonite and these two materials then mixed. The dichlorethyl ether is preferably added to the mixture of nicotine and bentonite prior to admixing with the nicotine suspended upon the diatomaceous earth. Various other emulsifying agents can be employed in addition to the bentonite, for example, such emulsifying agents as blends of oleyl alcohol and diethyl cyclo hexylamine lauric sulphate can be added along with suitable odor masking agents, etc. Also, other insecticides or fungicides such as dusting sulphur or finely divided copper or copper salts may be admixed with the powdered material above referred to. The presence of emulsifying agents renders the final insecticide capable of being employed either as a dust or, by addition of water, as a spray. If it is desired to employ this material as a spray, the addition of a small amount of a known or suitable wetting agent is also advantageous, as such wetting agents tend to retain the solid materials in suspension and also to cause the spray to wet plants or insects when the spray is applied. It is, of course, to be understood that sprays containing the nicotine or nicotine sulphate and dichlorethyl ether either in solution or suspension with or without the addition of a finely divided solid material can likewise be prepared. The dusting powders or sprays can be either acid or alkaline, and, if acid, can be made alkaline by the addition of hydrated lime or other alkali. Liquid mediums other than water, for example, light hydrocarbons, or emulsions containing such hydrocarbon and water may likewise be employed. It will thus be seen that the present invention is applicable to insecticidal dusts or sprays of nearly any composition and that the dichlorethyl ether markedly increases the efficiency of the nicotine both as a killing agent and as a feeding inhibitor for insects.

The term "nicotine" as employed in the claims is intended to embrace nicotine ether in the form of the alkaloid or a derivative such as nicotine sulphate.

I have obtained best results using beta-beta-dichlorethyl ether as the dichlorethyl ether compound. There are other dichlorethyl ethers as follows: $CH_2ClCHClOC_2H_5$; $CH_3CHClOCH_2ClCH_3$;

$CHCl_2CHOC_2H_5$; $CH_3CHCl_2OC_2H_3$ and $CH_2ClCH_2OCHClCH_3$ but the latter compounds do not give as good results as the beta-beta-derivative. For example said latter compounds are unstable and on decomposition form products which often injure the plant tissue. Although I have specified beta-beta-dichlorethyl ether, it is understood that it is not necessary to use the pure compound, but instead the commercial material as well as mixtures of the beta-beta-compound with other dichlor derivatives or other materials may be used.

This application is a continuation-in-part of application Serial No. 462,294, filed October 16, 1942, now abandoned.

While we have disclosed the preferred embodiments of our invention, it is understood that the details thereof may be varied within the scope of the following claims.

1. An insecticide comprising ½ to 5% of nicotine and beta-beta-dichlorethyl ether in an amount equal to 25 to 100% of the nicotine, the remainder consisting essentially of an inert carrier.

2. An insecticide comprising nicotine and beta-beta-dichlorethyl ether; said nicotine and said beta-beta-dichlorethyl ether being present in a sufficient amount to provide, as compared with the separate insecticidal properties of the components, an improved insecticide that is effective over a longer period of time, that is effective under acid conditions, and that retains a greater insecticidal property at lower temperatures.

3. An insecticide dust comprising an inert powder carrier material having distributed thereon nicotine and beta-beta-dichlorethyl ether; said nicotine and said beta-beta-dichlorethyl ether being present in a sufficient amount to provide, as compared with the separate insecticidal properties of the components, an improved insecticide that is effective over a longer period of time, that is effective under acid conditions, and that retains a greater insecticidal property at lower temperatures.

4. An insecticide suitable for employment either as a dust or a spray when added to water, which comprises an inert powdered carrier upon which is distributed nicotine and beta-beta-dichlorethyl ether, said insecticide containing an emulsifying agent; said nicotine and said beta-beta-dichlorethyl ether being present in a sufficient amount to provide, as compared with the separate insecticidal properties of the components, an improved insecticide that is effective over a longer period of time, that is effective under acid conditions, and that retains a greater insecticidal property at lower temperatures.

5. An insecticide comprising nicotine and beta-beta-dichlorethyl ether distributed upon a finely divided solid carrier including diatomaceous earth and bentonite; said nicotine and said beta-beta-dichlorethyl ether being present in a sufficient amount to provide, as compared with the separate insecticidal properties of the components, an improved insecticide that is effective over a longer period of time, that is effective under acid conditions, and that retains a greater insecticidal property at lower temperatures.

6. An insecticide comprising nicotine and beta-beta-dichlorethyl ether in a liquid medium; said nicotine and said beta-beta-dichlorethyl ether being present in a sufficient amount to provide, as compared with the separate insecticidal properties of the components, an improved insecticide that is effective over a longer period of time, that is effective under acid conditions, and that retains a greater insecticidal property at lower temperatures.

7. An insecticide comprising nicotine and beta-beta-dichlorethyl ether; said nicotine being present in the proportion of one-half to 5 per cent, and said beta-beta-dichlorethyl ether being present in the proportion of from one-quarter to 3 per cent, to provide, as compared with the separate insecticidal properties of the components, an improved insecticide that is effective over a longer period of time, that is effective under acid conditions, and that retains a greater insecticidal property at lower temperatures.

8. An insecticide dust comprising an inert carrier material having nicotine and beta-beta-dichlorethyl ether present; said nicotine being present in the proportion of from one-half to 5 per cent, and said beta-beta-dichlorethyl ether being present in the proportion of from one-quarter to 3 per cent to provide, as compared with the separate insecticidal properties of the components, an improved insecticide that is effective over a longer period of time, that is effective under acid conditions, and that retains a greater insecticidal property at lower temperatures.

9. An insecticide comprising nicotine and beta-beta-dichlorethyl ether; said nicotine being present in the proportion of from one-half to 5 per cent, and said beta-beta-dichlorethyl ether being present in an amount equal to 25 per cent to 100 per cent of the nicotine to provide, as compared with the separate insecticidal properties of the components, an improved insecticide that is effective over a longer period of time, that is effective under acid conditions, and that retains a greater insecticidal property at lower temperatures.

OWEN T. COFFIN.
DAVID J. RADEN.

REFERENCES CITED

The following references are of record in the file of this patent:

UNITED STATES PATENTS

| Number | Name | Date |
|---|---|---|
| 1,861,127 | McLane | May 31, 1932 |
| 1,954,517 | Bousquet et al. | Apr. 10, 1934 |